Oct. 14, 1969 K. J. HECKER 3,472,948

COLOR IMAGE DISSECTOR

Filed Aug. 1, 1966

KLAUS J. HECKER
INVENTOR.

BY T. M. Phillips
J. M. St. Amand

ATTORNEYS

United States Patent Office 3,472,948
Patented Oct. 14, 1969

3,472,948

COLOR IMAGE DISSECTOR

Klaus J. Hecker, Oberursel, Germany, assignor to the United States of America as represented by the Secretary of the Navy Filed Aug. 1, 1966, Ser. No. 570,130
Int. Cl. H04n 5/38, 5/44
U.S. Cl. 178—5.4 3 Claims

ABSTRACT OF THE DISCLOSURE

A color image dissector for the transmission of color television signals which are compatible with black and white television receivers. The color components of the image are separated by a filter grid in front of the photo cathode which divides each television line to be scanned into three stripes each of which carries different color information. The three apertures of the image dissector are used to read out information from the three color stripes in such a way that the three color components of any one resolution element are available simultaneously.

The invention herein described may be manufactured and used by or for the Government of the United States of America for governmental purposes without the payment of any royalties thereon or therefor.

The present invention relates to color image dissectors and more particularly to color image dissectors for the transmission of color television signals which are compatible with black and white television receivers. The Federal Communication Commission Standard Color Television System requires the simultaneous generation of three signals which carry information about three primary colors of the image. Prior to the transmission, these three signals are mixed in a specific way to obtain compatibility with black and white television receivers. In the conventional television camera used for color television pickup, a scene is imaged via optics and dichroic mirrors onto three pickup tubes in such a way that each pickup tube only receives image information in one primary color. The three pickup tubes are deflected by their respective deflection means and in an identical manner in order to obtain three video signals which are amplified and mixed in a mixer in the way prescribed by the F.C.C. standards resulting in a luminance signal and two chrominance signals. This system requires three separate image pickup tubes and their respective deflection means, which must be carefully aligned in order to produce the correct video signals.

An object of the present invention is to provide a single pickup tube which will eliminate the need for three separate pickup tubes.

Another object of the invention is to provide a color television pickup tube in which the color components of the image are separated by a filter grid in front of the photocathode and divides each television line to be scanned into three strips each of which carries different color information; the three apertures of the image dissector are then used to readout information from the three color strips in such a way that the three color components of any one resolution element are available simultaneously.

Other objects and many of the attendant advantages of this invention will become readily appreciated as the same becomes better understood by reference to the following detailed description when considered in connection with the accompanying drawings wherein.

Figure 1:
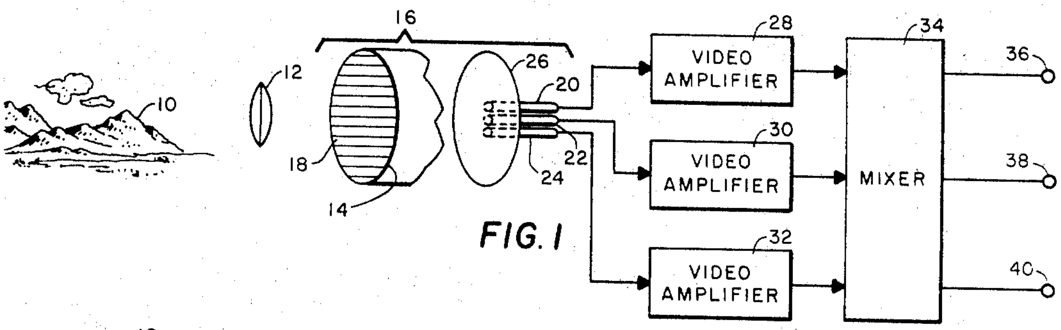
FIG. 1 is a simplified diagrammatic view of one form of a camera tube embodying the invention.

FIGS. 4, 5, 6, and 7 are alternate forms of the aperture plate pattern arrangement of FIG. 1.

Referring now to the drawings there is shown in FIG. 1, scene 10 which is imaged via optics 12 onto photocathode 14 of image dissector 16. A filter grid 18 is positioned in the path of the light which may be in close proximity to or may be an integral part of photocathode 14 and consist of a repetitive pattern of three narrow color filter strips as shown in the detailed drawing of FIG. 2. The spacing between sets of the repetitive pattern is made equal to the spacing of individual raster lines of the television raster. Filter grid 18 splits the image of scene 10 in such a way that different specific strips of photocathode 14 are exposed to specific color components of image 10 (not necessarily the primary color components; each strip may receive the full spectrum of colors with just one primary color filtered out). As for example, all strips designated A are red, strips designated B are blue and strips designated C are green. Three electron multipliers 20, 22, and 24 are mounted on aperture plate 26 in such a way that each electron multiplier receives electrons from one of three different consecutive strips of photocathode 14 corresponding to the color strips of filter grid 18. The electron image is deflected by conventional deflection means (not shown) across aperture plate 26 in such a way that during one particular scanning line anyone electron multiplier receives information from only one specific color strip of filter grid 18. During the next scanning line the same multiplier receives information from a different strip of the same specific color, etc. The video information appearing at the outputs of electron multipliers 20, 22, and 24 correspond then to three color component signals similar to a conventional color television camera. The output signals from electron multipliers 20, 22, and 24 are amplified in video amplifiers 28, 30, and 32 respectively and fed to mixer 34 where the signals are added in such a way that the required luminance and chrominance channels are obtained at the outputs of terminals 36, 38, and 40 as required by F.C.C. standards.

Figure 3:
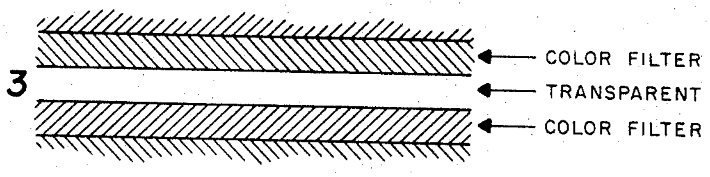
FIG. 3 is a form of the filter grid of FIG. 1.

When the filter grid of FIG. 3 is used, only two color filter strips are used which together with one strip without any filtering action (transparent in the spectrum of interest) comprise one set which is repeated across the filter grid. The outputs of the three electron multipliers will then consist of one signal corresponding to the total brightness of the image and to signals carrying color information which can be mixed in order to obtain the signals required by the F.C.C. standards.

Figures 2, 4:
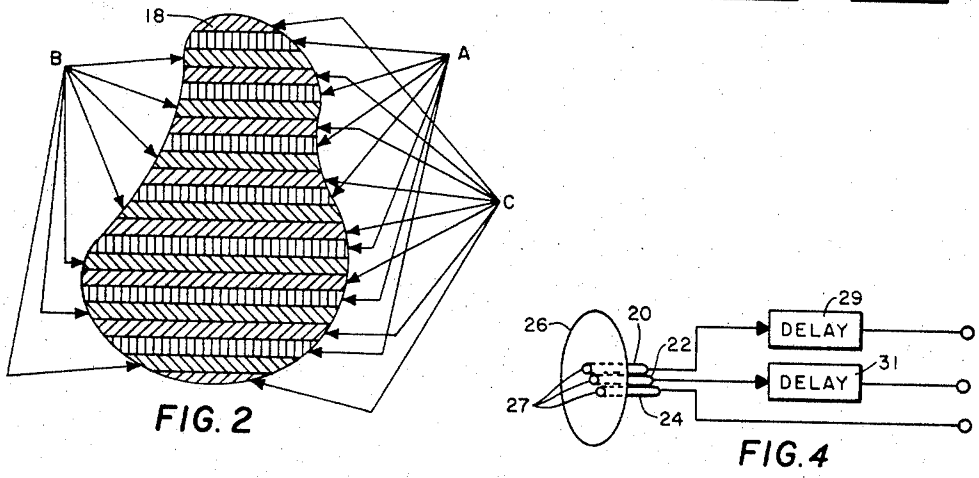
FIG. 2 is an enlarged cut-a-way section of the filter grid of FIG. 1.
Figure 6:
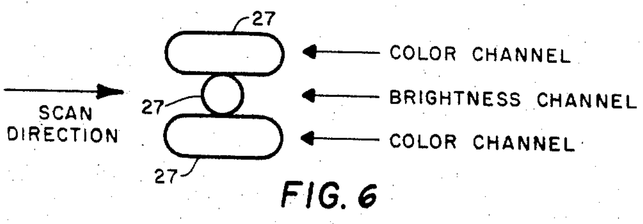
Figure 5:
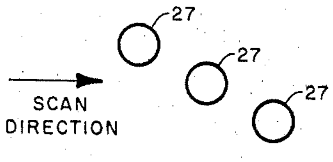
Figure 7:
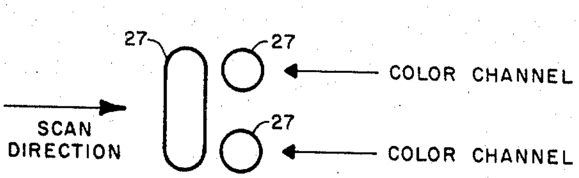

The apertures or holes 25 in aperture plate 26 may be arranged in a pattern as shown in FIGS. 4 and 5. This arrangement will permit closer spacing of the three aperture holes orthogonal to the scan direction without requiring close physical spacing. Delay lines 29 and 31 are provided in series with electron multipliers 20 and 22 respectively to equalize the output signals. In order to increase the sensitivity of the image dissector 16 and since the chrominance signals required by the F.C.C. standard television signals are of smaller bandwidth than the luminance channel, the apertures from which the chrominance signals are obtained may be shaped as shown in FIG. 6. The holes in aperture plate 26 may also be arranged in the manner as shown in FIG. 7. Here the brightness channel receives information from all three color filter strips.

Obviously many modifications and variations of the present invention are possible in the light of the above teachings. It is therefore to be understood that within the scope of the appended claims the invention may be practiced other wise than as specifically described.

What is claimed is:

1. In an imaging tube for color television the combination comprising:

(a) a photocathode, (b) filter grid means positioned in front of said photocathode so that different specific strips of said photocathode are exposed to specific color components of the image focused on said photocathode, (c) an aperture plate having apertures corresponding to said three different consecutive strips of said photocathode, (d) an electron multiplier positioned in back of each of said apertures for amplifying electrons emitted from said photocathode and producing an output.

2. The imaging tube of claim 1 wherein said filter grid comprises sets of filter strips, each set including two color filters and having a transparent portion intermediate.

3. The imaging tube of claim 1 in combination with:

(a) optical means for focusing an image onto the photocathode of said image tube, (b) deflection and focusing means for deflecting and focusing the electron image produced by said photocathode onto the aperture plate of said imaging tube, (c) amplifying means coupled to the electron multipliers of said imaging tube, (d) signal mixing means coupled to said amplifying means for adding the signals from said amplifying means to produce standard color television channel signals.

References Cited

UNITED STATES PATENTS

| | | | |
|---|---|---|---|
| 2,769,855 | 11/1956 | Boothroyd | 178—5.4 |
| 3,366,735 | 1/1968 | Hecker | 178—7.2 |

RICHARD MURRAY, Primary Examiner